(12) United States Patent
Bodard et al.

(10) Patent No.: US 9,938,901 B2
(45) Date of Patent: Apr. 10, 2018

(54) ATTACHMENT PYLON FOR A TURBINE ENGINE

(71) Applicant: SNECMA, Paris (FR)

(72) Inventors: Guillaume Bodard, Verneuil l'Etang (FR); Cyprien Henry, Paris (FR); Norman Jodet, Savigny-sur-Orge (FR); Alexandre Alfred Gaston Vuillemin, Moissy-Cramayle (FR)

(73) Assignee: SNECMA, Paris (FR)

( * ) Notice: Subject to any disclaimer, the term of this patent is extended or adjusted under 35 U.S.C. 154(b) by 486 days.

(21) Appl. No.: 14/356,045

(22) PCT Filed: Oct. 24, 2012

(86) PCT No.: PCT/FR2012/052439
§ 371 (c)(1),
(2) Date: May 2, 2014

(87) PCT Pub. No.: WO2013/064768
PCT Pub. Date: May 10, 2013

(65) Prior Publication Data
US 2014/0290270 A1    Oct. 2, 2014

(30) Foreign Application Priority Data
Nov. 3, 2011    (FR) .................................... 11 59953

(51) Int. Cl.
*F02C 7/20*    (2006.01)
*B64D 29/02*    (2006.01)

(52) U.S. Cl.
CPC ............... *F02C 7/20* (2013.01); *B64D 29/02* (2013.01); *B64C 2230/14* (2013.01); *Y02T 50/166* (2013.01)

(58) Field of Classification Search
CPC ........ B64D 27/10; B64D 27/12; B64D 27/16; B64D 27/18; B64D 29/02; F02C 7/20; B64C 2230/14; Y02T 50/166
See application file for complete search history.

(56) References Cited

U.S. PATENT DOCUMENTS 4,172,574 A * 10/1979 Spillman ............... B64C 23/065
114/272
4,298,089 A * 11/1981 Birch ...................... F02K 1/386
181/213

(Continued)

FOREIGN PATENT DOCUMENTS

EP    2 402 251 A2    1/2012
GB    2 112 077 A    7/1983

(Continued)

OTHER PUBLICATIONS

International Search Report dated Oct. 10, 2013 in Corresponding PCT/FR2012/052439.

*Primary Examiner* — Ted Kim
(74) *Attorney, Agent, or Firm* — Oblon, McClelland, Maier & Neustadt, L.L.P.

(57) ABSTRACT

A pylon for attaching a turbine engine, the pylon configured to connect the engine to a structural element of an aircraft. The pylon includes a streamlined profile defined by two opposite lateral faces and defined longitudinally between a leading edge and a trailing edge. On each of its lateral faces the pylon includes a series of deflectors that are transversely spaced apart from one another and that define between them convergent and curved channels configured to accelerate air streams flowing within the channels on aircraft takeoff or in flight to deflect the air streams towards a jet of the engine.

11 Claims, 3 Drawing Sheets

(56) References Cited

U.S. PATENT DOCUMENTS

| | | | |
|---|---|---|---|
| 4,314,681 A * | 2/1982 | Kutney | B64C 7/02 244/130 |
| 4,466,587 A | 8/1984 | Dusa et al. | |
| 5,216,879 A | 6/1993 | Zysmaan | |
| 9,669,920 B2 * | 6/2017 | Emunds | B64C 7/00 |
| 2007/0107414 A1 | 5/2007 | Papamoschou | |
| 2008/0067292 A1 * | 3/2008 | Bonnaud | B64C 7/02 244/199.1 |
| 2012/0001022 A1 | 1/2012 | Morvant et al. | |
| 2012/0273610 A1 | 11/2012 | Bedoin et al. | |

FOREIGN PATENT DOCUMENTS

| | | |
|---|---|---|
| GB | 2 260 369 A | 4/1993 |
| WO | WO 2011/055062 A1 | 5/2011 |

\* cited by examiner

ATTACHMENT PYLON FOR A TURBINE ENGINE

FIELD OF THE INVENTION

The present disclosure relates to an attachment pylon (or mast) for a turbine engine, and to an aircraft device including such a pylon.

More particularly, such a pylon may be used to attach a turbojet to the wing of an airplane.

STATE OF THE PRIOR ART

The general trend over the last forty years towards reducing engine noise from airplanes, and more particularly from bypass turbojets, has been to increase the bypass ratio (BPR) of such turbojets, i.e. to increase the ratio of the bypass stream to the primary stream leaving the turbojet. Present projects propose engines with a high BPR lying in the range 9 to 12, whereas in the 1970s, BPRs laid in the range 5 to 6. Specifically, for constant thrust, increasing the flow rate of the bypass stream serves to reduce ejection speeds and thereby reduce the noise due to the mixing of the ejection gases. Nevertheless, increasing the BPR leads to a major drawback in terms of integrating engines on an airplane, since increasing the flow rate of the bypass stream necessarily involves increasing the diameter of the engines. Unfortunately, nowadays the reasonable limiting size for integrating a turbojet with a ducted fan under an airplane wing would appear to have been nearly reached, and it would seem to be difficult to continue on those lines.

Another known solution for reducing the jet noise from a turbojet, in particular on takeoff, consists in providing chevrons on the edge of the primary nozzle of the turbojet, as described for example in patent document EP 1 580 419 A1. Although that solution is quite effective in acoustic terms, it nevertheless presents a negative effect on the performance of the turbojet under cruising conditions. Furthermore, the improvements that have been demonstrated remain modest.

There therefore exists a need for a solution making it possible to reduce airplane engine noise and that avoids the above-mentioned drawbacks, at least in part.

SUMMARY OF THE INVENTION

The present description relates to a pylon for attaching a turbine engine, the pylon being configured to connect the engine to a structural element of an aircraft, the pylon having a streamlined profile defined by two opposite lateral faces and defined longitudinally between a leading edge and a trailing edge.

This pylon is such that it further comprises, on each of its lateral faces, a series of deflectors that are transversely spaced apart from one another. Between them and/or together with the outside wall of the engine, these deflectors define channels within which streams of air flow during aircraft takeoff or in flight. These channels are convergent and curved so as to accelerate said air streams and guide the air streams towards the jet of the engine.

The term "convergent" is used of channels to indicate that the channels are of flow section that decreases progressively from upstream to downstream, so as to accelerate the air streams passing along the channels.

The presence of deflectors serves to accelerate and deflect a portion of the air flow passing round the pylon for the purpose of reducing the jet noise of the engine. Furthermore, in comparison with the prior art solution of using chevrons, deflectors have the advantage of not constituting an obstacle to the jet leaving the engine.

In the present description, the adjectives "longitudinal" and "transverse" (and the adjectives "longitudinally" and "transversely") are used with reference to the longitudinal and transverse directions of the pylon. The longitudinal direction of the pylon is a direction that is parallel to the drive axis of the engine (i.e. the axis of rotation of the turbine engine rotor), when the engine is fastened to the pylon. This longitudinal direction consequently corresponds to the general direction of the flow of air passing around the pylon under normal conditions of use. The transverse direction is the direction perpendicular to the longitudinal direction passing through the engine.

The pylon is defined transversely between a distal end for fastening to the engine and a proximal end for fastening to the structural element of the aircraft. The adjectives "proximal" and "distal" are used with reference to the connection of the pylon to the structural element of the aircraft.

Finally, "upstream" and "downstream" are defined relative to the normal flow direction of air during takeoff or in flight.

The present description also relates to a device for aircraft, the device comprising a turbine engine and a pylon of the above-specified type, whereby the engine can be connected to a structural element of the aircraft.

Said engine may be an aviation turbine engine such as an aeroengine, and more particularly a turbojet or a turboprop. Furthermore, said structure may be an element forming part of the wing or the fuselage of the aircraft. The aircraft may be an airplane. Naturally, the invention is not limited to these examples.

In certain embodiments, the engine is an aeroengine, in particular a turbojet, and the structural element is an airplane wing.

When the airplane is moving (e.g. on takeoff or in flight), a flow of air (referred to as "outside air") flows between the engine and the wing. The pylon connecting these two elements together constitutes an obstacle to this flow and generates a large pocket of turbulent kinetic energy that sucks the jet towards the wing. This gives rise to two noise-generating phenomena due to the following interactions:

interaction between the wake of the pylon and the jet of the engine; and interaction between the wing and the jet sucked towards the wing.

By means of the proposed solution, it is possible to control a portion of the flow of outside air so as to make it useful in reducing the noise of the jet. In particular, the fact of accelerating the outside air while guiding it towards the jet by means of vanes serves to reduce the speed gradient in the mixing layer between the jet and the outside air. Furthermore, it has been found that the fact of deflecting a portion of the outside air towards the lower end of the pylon serves to attenuate the generation of the pocket of turbulent kinetic energy downstream from the pylon.

Thus, by means of the proposed solution, it is possible to diminish noise-generating phenomena including the interaction between the wake of the pylon and the jet, and the interaction between the jet and the wing.

The interaction between the wake of the pylon and the jet can be diminished because the pocket of turbulent kinetic energy that is responsible for that interaction can be diminished.

The interaction between the jet and the wing can be diminished, since the pocket of turbulent kinetic energy can be diminished by increasing the flow speed around the engine. Furthermore, by controlling the outside air, it is possible to influence the jet to reduce its radial expansion towards the wing.

Furthermore, mixing noise can be reduced. Specifically, this noise is the result of shear between the air stream coming from the engine (typically the bypass stream) and the outside air stream, these two streams traveling at different speeds. Accelerating the outside air, and thus obtaining a smaller difference between these two flows, thus contributes to reducing the shear and the resulting noise component. Shock noise can also be reduced. Specifically, shock noise comes from the complex interaction between shock cells present in the bypass stream and the turbulence in the mixing layer. Less shear implies less turbulence and thus smaller levels of interaction between the two elements that generate shock noise.

In certain embodiments, the deflector series are situated solely in the distal portion of the pylon, i.e. in the portion close to the engine. This makes it possible to avoid the presence of deflectors in the proximal portion of the pylon, close to the wing, and thus to minimize the impact of deflectors on the lift of the wing.

In certain embodiments, each deflector extends longitudinally from the leading edge of the pylon. This makes it possible to avoid an outside boundary layer developing upstream from the channels created by the deflectors, where such a boundary layer would impede good channeling of the flow.

In certain embodiments, each deflector extends longitudinally towards the jet, the downstream end of each deflector being close to the jet, while nevertheless being outside it. This makes it possible to bring the air stream as close as possible to the jet without the vanes constituting obstacles to the jet.

In certain embodiments, each deflector presents a height in the thickness direction of the pylon lying in the range 5% to 50% of the diameter of the engine. This makes it possible to control the flow in the proximity of the engine while avoiding impacting the flow beyond this zone of interest.

In certain embodiments, each deflector is twisted so as to guide the air stream both towards the jet of the engine and into the wake of the pylon. In other words, the deflectors present curvature both in their longitudinal section planes parallel to the engine-wing direction, and in their transverse section planes.

In certain embodiments, each series of deflectors comprises one to four deflectors. When a "series" has only one deflector, said convergent and curved channel is defined between that deflector and the outside wall of the engine.

In certain embodiments, each series of deflectors has at least two deflectors, and preferably at least three deflectors. This makes it possible to reduce the speed gradients in stages, and thus to have a plurality of shear layers between streams flowing at speeds that are fairly close together.

The above-mentioned characteristics and advantages, and others, appear on reading the following detailed description of embodiments of the proposed attachment pylon and device. The detailed description makes reference to the accompanying drawings.

BRIEF DESCRIPTION OF THE DRAWINGS

The accompanying drawings are diagrammatic and not to scale; they seek above all to illustrate the principles of the invention.

In the drawings, from one figure to another, elements (or portions of an element) that are identical are referenced by the same reference signs. In addition, elements (or portions of an element) belonging to embodiments that are different but having functions that are analogous are referenced in the figures by numerical references spaced apart by 100, 200, etc.

DETAILED DESCRIPTION OF EMBODIMENTS

Figure 1:
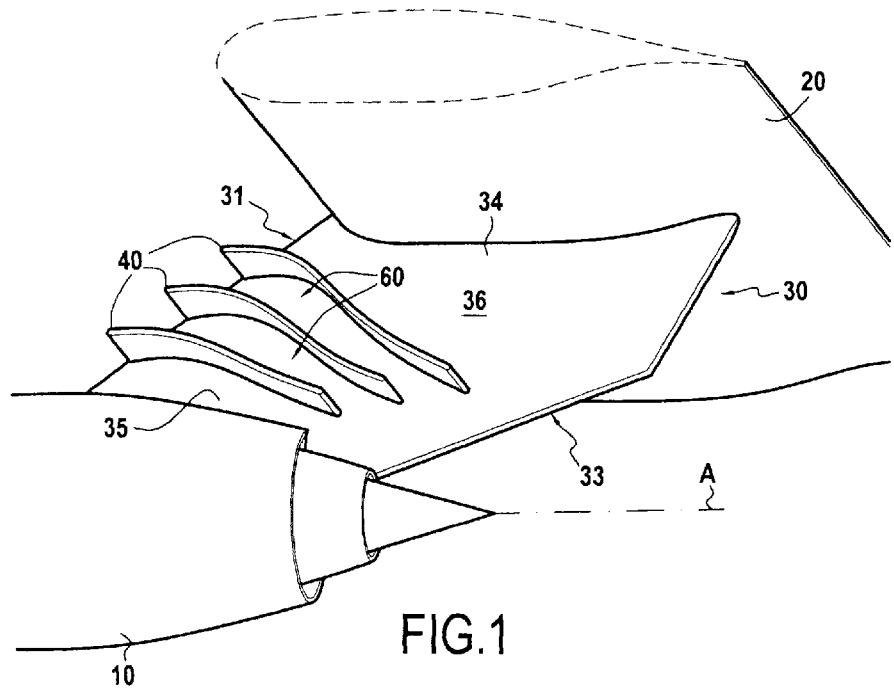
FIG. 1 is a perspective view of an example of an attachment pylon connecting a turbojet to an airplane wing.

Embodiments are described below in detail with reference to the accompanying drawings. These embodiments show the characteristics and the advantages of the invention. It should nevertheless be recalled that the invention is not limited to these embodiments. In particular, although the invention is described below in the context of its application to a turbojet (of the bypass type having two separate streams) that is fastened under an airplane wing, the invention is not limited to this application.

FIGS. 1 to 4 show a turbojet 10 fastened under an airplane wing 20 by means of an attachment pylon 30. The drive axis A of the turbojet 10 is drawn in chain-dotted lines in the figures.

The pylon 30 has a streamlined profile defined by two opposite faces 36 and 38 and it extends longitudinally (i.e. parallel to the drive axis A) between a leading edge 31 and a trailing edge 33. The pylon 30 is defined transversely between a distal end 35 fastened to the turbojet 10 and a proximal end 34 fastened to the wing 20 of the airplane.

Figure 2:
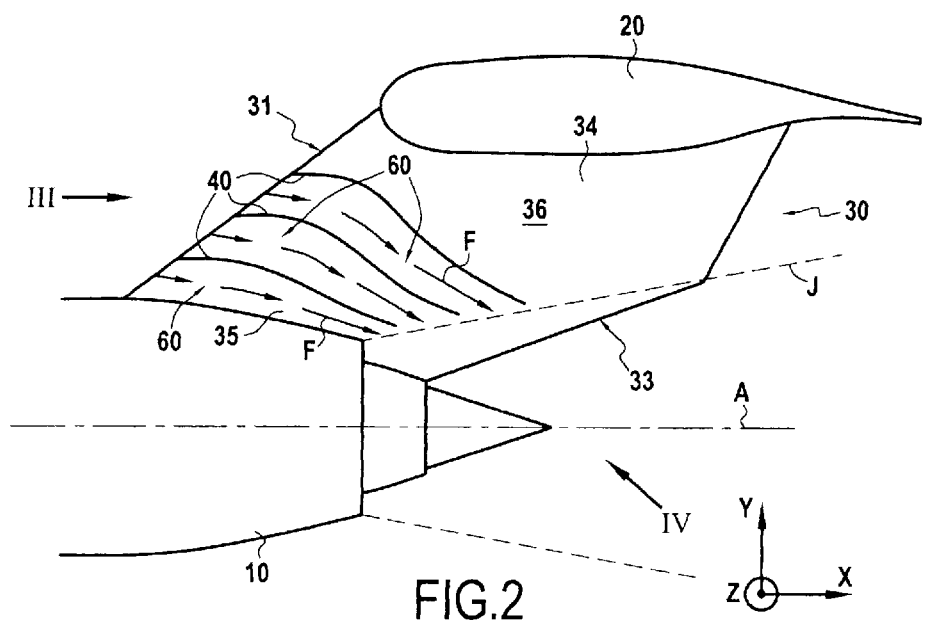
FIG. 2 is a side view of the FIG. 1 pylon.

The longitudinal and transverse directions are referenced X and Y respectively in the figures. The direction Z, which is referenced in FIG. 2, is the thickness direction of the pylon 30. The term "longitudinal plane" is used to designate a plane parallel to the directions X and Y. A longitudinal plane is referenced XY. The term "transverse plane" designates a plane parallel to the directions Y and Z. A transverse plane is referenced YZ.

Figure 3:
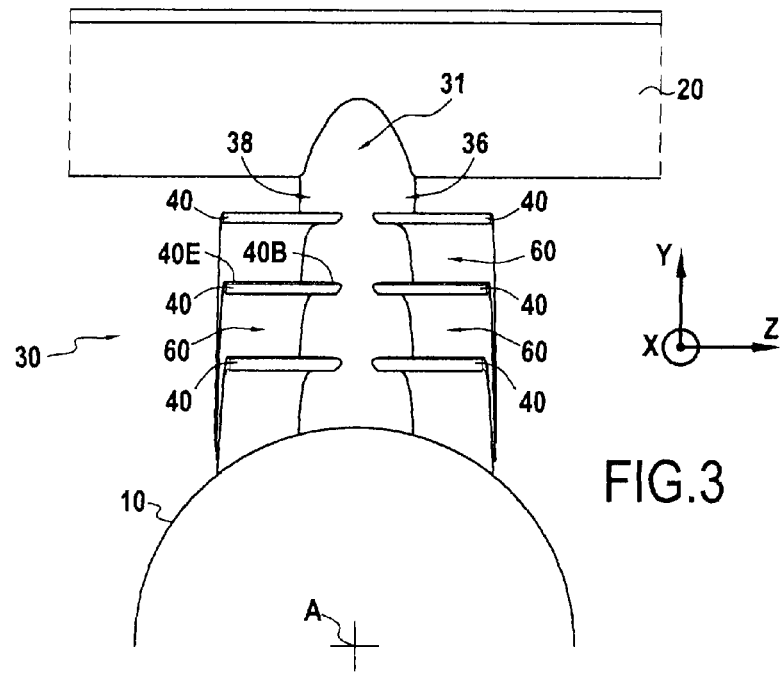
FIG. 3 is a front view of the FIG. 2 pylon looking along arrow III.
Figure 4:
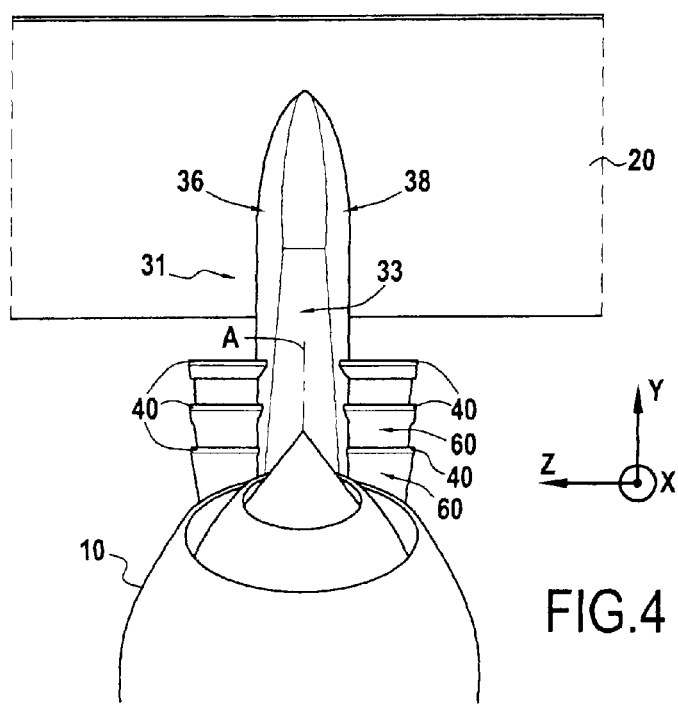
FIG. 4 is a rear view of the FIG. 2 pylon looking along arrow IV.

In addition, on each of its lateral faces 36 and 38, the pylon 30 has a series of three deflectors 40 formed by strips and connected via their bases 40B to the body of the pylon 30 (see FIG. 3). In transverse planes YZ, the deflectors 40 extend substantially perpendicularly relative to the faces 36 and 38, going from their bases 40B to their free ends 40E. By way of example, the deflectors 40 are fastened to the body of the pylon by riveting or by welding. The deflectors 40 of the pylon 30 are spaced apart transversely (i.e. in the direction Y) relative to one another, and between them they define channels 60. Respective air streams F flow along these channels 60 on takeoff or in flight. These channels 60 are convergent in the sense that their flow sections decrease progressively going from upstream to downstream. In particular, in the embodiment shown, the height (measured along the axis Z) of the vanes 40 is substantially constant along the channels 60, while the vanes 40 come closer to one another going from upstream to downstream (see FIG. 2).

This results in a decrease in the flow sections of the channels 60, thereby causing the air streams F flowing in these channels 60 to accelerate.

The vanes 40 are curved in their longitudinal planes XY, as shown in FIG. 2, thereby serving to deflect the air streams F towards the jet J leaving the turbojet. The jet J is represented by dashed lines in FIG. 2. It should be observed that the deflectors 40 do not form obstacles to the jet J. In particular, the downstream end of each deflector 40 is situated close to the jet J while remaining outside it (see FIG. 2). Thus, no deflector 40 extends longitudinally as far as the downstream edge 33 of the pylon. Such a configuration makes it possible to bring the air streams F as close as possible to the jet J, while nevertheless not forming an obstacle to the jet.

The series of deflectors 40 are situated in the distal portion of the pylon 30, close to the turbojet 10. The proximal portion of the pylon 30, close to the wing 20, does not have deflectors 40, thereby serving to minimize the impact of the deflectors 40 on the lift of the wing 20.

Each deflector 40 extends longitudinally from the leading edge 31 of the pylon (see FIGS. 2 and 3). This serves to avoid developing an outside boundary layer upstream from the channels 60, where such a boundary layer would impede good channeling of the streams F in the channels 60.

In the thickness direction of the pylon 30, i.e. in the direction Z, each deflector 40 presents a height lying in the range 5% to 50% of the diameter of the turbojet 10. In the embodiment shown, this height is equal to about 20% of the diameter. This makes it possible to control the flow in the proximity of the engine, while not impacting the flow beyond this zone of interest.

In certain embodiments, each deflector 40 is twisted so as to guide the air streams F both towards the jet from the turbojet 10 and towards the wake of the pylon 30. In other words, the deflectors present curvature both in their longitudinal section planes XY and in their transverse section planes YZ.

Figure 5:
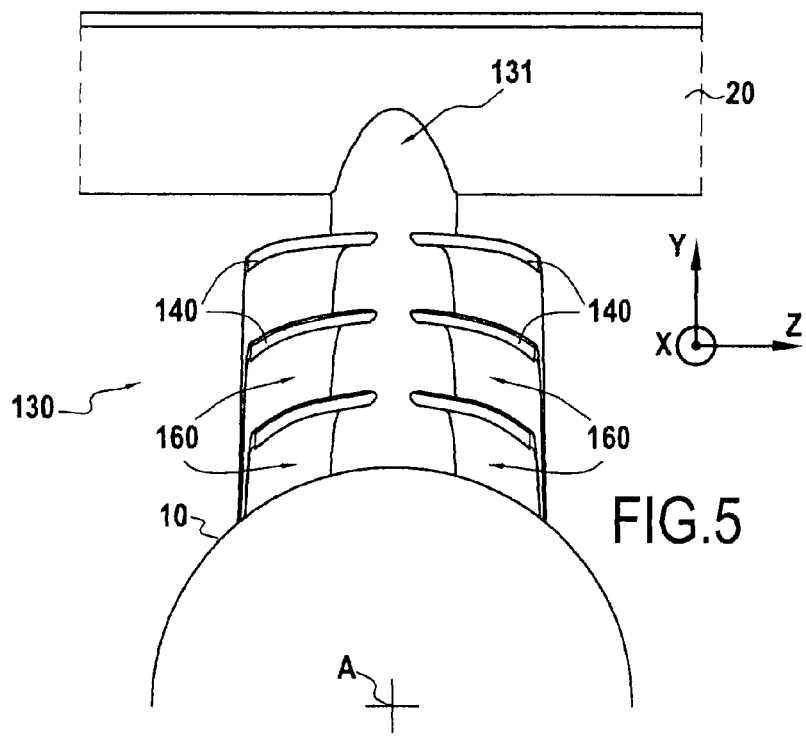
FIG. 5 is a front view analogous to the view of FIG. 3 showing another example of a pylon.
Figure 6:
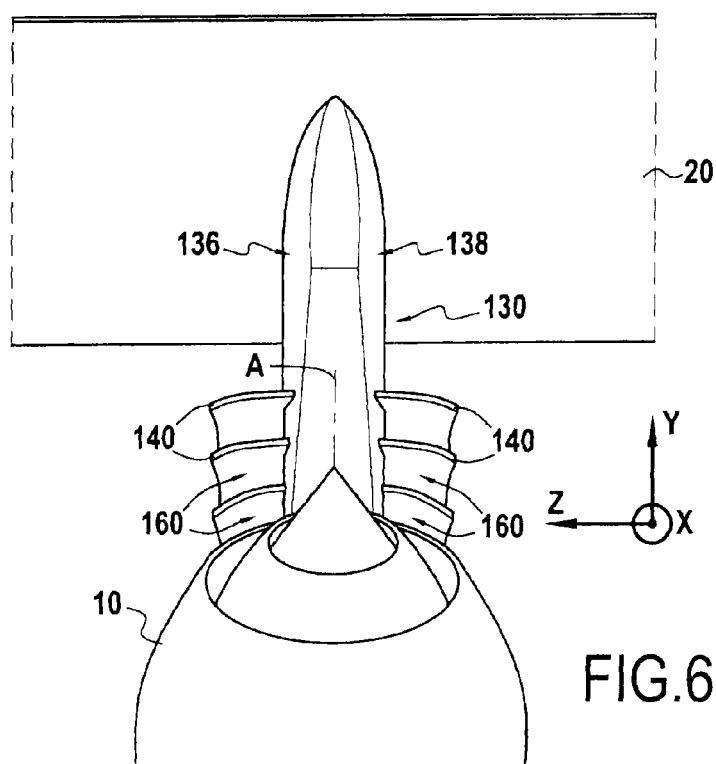
FIG. 6 is a rear view, analogous to that of FIG. 4, showing the FIG. 5 pylon.

Another example of a pylon 130 is shown in FIGS. 5 and 6, this pylon 130 differing from the pylon of FIGS. 1 to 4 solely by the fact that the deflectors 140 are curved in their transverse planes YZ instead of being straight like the deflectors 40.

The deflectors 140 of FIGS. 5 and 6 are twisted in the sense that they present curvature in their longitudinal planes XY and curvature in their transverse planes YZ. It should be observed that since the deflectors 140 follow the faces 136 and 138 of the pylon, each of them follows the curvature of these faces in respective planes XZ.

The curvature in the transverse planes YZ serve to guide the air streams F both towards the jet J of the turbojet 10 and into the wake of the pylon 130. This curvature is such that, in the transverse planes YZ, the deflectors 140 define concave sides facing towards the turbojet 10.

In the embodiment shown, the curvature of the deflectors 140 is progressively more marked on approaching the turbojet 10, as shown in FIGS. 5 and 6. This makes it possible to accelerate the flow outside the engine immediately before ejection.

The embodiments described in the present description are given by way of non-limiting illustration, and, in the light of this description, a person skilled in the art can easily modify these embodiments or can envisage others, while remaining within the scope of the invention.

Furthermore, the various characteristics of these embodiments may be used singly or in combination with one another. When they are combined, these characteristics may be combined as described above or in other ways, the invention not being limited to the specific combinations described in the present description. In particular, unless specified to the contrary, a characteristic described with reference to one particular embodiment may be applied in analogous manner to any other embodiment.

The invention claimed is:

1. A pylon for attaching a turbine engine, the pylon configured to connect the engine to a structural element of an aircraft, the pylon comprising:
   a streamlined profile defined by two opposite lateral faces and defined in a longitudinal direction between a leading edge and a trailing edge; and
   on each of the lateral faces, a respective series of deflectors that are spaced apart from one another in a transverse direction perpendicular to the longitudinal direction so that, between an outside wall of the engine and a first deflector and between the first deflector and a second deflector, or between the first deflector and the second deflector and between the second deflector and a third deflector, at least two channels are defined within which air streams flow on aircraft takeoff or in flight, each of the at least two channels being convergent, so that each of the at least two channels are of flow section that decreases progressively from upstream to downstream, and curved to accelerate the air streams and to guide the air streams towards a jet of the engine, the first deflector being closer to the outside wall of the engine than the second deflector in the transverse direction and the second deflector being closer to the outside wall of the engine than the third deflector in the transverse direction.

2. A pylon according to claim 1, wherein the pylon extends transversely between a distal end for fastening to the engine and a proximal end for fastening to the structural element of the aircraft, and wherein the proximal portion of the pylon does not have deflectors.

3. A pylon according to claim 1, wherein each deflector extends longitudinally from the leading edge of the pylon, an end of each deflector in a longitudinal direction of the pylon being coincident with the leading edge of the pylon.

4. A pylon according to claim 1, wherein each deflector extends longitudinally towards the jet, a downstream end of each deflector being situated in proximity of the jet, while remaining outside the jet.

5. A pylon according to claim 1, wherein each deflector presents a height, in a thickness direction of the pylon, in a range of 5% to 50% of diameter of the engine.

6. A pylon according to claim 1, wherein each deflector is twisted to guide the air streams both towards the jet of the engine and into a wake of the pylon.

7. A device for an aircraft, comprising:
   a turbine engine; and
   a pylon according to claim 1, whereby the engine can be connected to a structural element of the aircraft.

8. A device according to claim 7, wherein the engine is an aeroengine and wherein the structural element is an airplane wing.

9. A device according to claim 7, wherein the engine is a turbojet.

10. A pylon according to claim 1, wherein the deflectors come progressively closer to one another while going in a direction from the leading edge toward the trailing edge of the pylon.

11. A pylon according to claim 1, wherein the deflectors are fastened to the pylon entirely along a length of the deflectors in the longitudinal direction of the pylon.

\* \* \* \* \*